United States Patent
Caubet et al.

(10) Patent No.: US 6,688,846 B2
(45) Date of Patent: Feb. 10, 2004

(54) DEVICE FOR CONTROLLING VARIABLE-PITCH BLADES

(75) Inventors: Jean-Pierre Caubet, Dammarie-les-Lys (FR); Antoine Jean, Melun (FR); Jacky Naudet, Bondoufle (FR); Gabrijel Radeljak, Le Raincy (FR); Sébastien Riccioz, Le Raincy (FR)

(73) Assignee: Snecma Moteurs, Paris (FR)

( * ) Notice: Subject to any disclaimer, the term of this patent is extended or adjusted under 35 U.S.C. 154(b) by 101 days.

(21) Appl. No.: 09/953,130

(22) Filed: Sep. 17, 2001

(65) Prior Publication Data

US 2002/0034439 A1 Mar. 21, 2002

(30) Foreign Application Priority Data

Sep. 18, 2000 (FR) .............................................. 00 11857

(51) Int. Cl.$^7$ ................................................ F01D 17/16
(52) U.S. Cl. ................ 415/160; 403/286; 403/291; 403/293; 403/61; 403/65; 403/73
(58) Field of Search ................................. 415/150, 159, 415/160, 161, 162; 403/286, 291–293, 52, 61, 65, 73

(56) References Cited

U.S. PATENT DOCUMENTS

| | | |
|---|---|---|
| 2,671,634 A | 3/1954 | Morley |
| 2,842,305 A * | 7/1958 | Eckenfels et al. ............ 415/160 |
| 2,999,630 A | 9/1961 | Warren et al. |
| 3,788,763 A * | 1/1974 | Nickles ........................ 415/160 |
| 4,498,790 A * | 2/1985 | Fisher ......................... 415/160 |
| 4,808,069 A * | 2/1989 | Bonner et al. ............... 415/160 |
| 4,979,874 A | 12/1990 | Myers |
| 5,024,580 A * | 6/1991 | Olive .......................... 415/150 |
| 5,601,401 A | 2/1997 | Matheny et al. |
| 6,019,574 A * | 2/2000 | DiBella ....................... 415/160 |

FOREIGN PATENT DOCUMENTS

| | | | |
|---|---|---|---|
| EP | 209428 A1 * | 1/1987 | ................. 415/161 |
| EP | 0 298 894 | 1/1989 | |
| FR | 2 608 678 | 6/1988 | |
| FR | 2 746 141 | 9/1997 | |

* cited by examiner

Primary Examiner—Christopher Verdier
(74) Attorney, Agent, or Firm—Oblon, Spivak, McClelland, Maier & Neustadt, P.C.

(57) ABSTRACT

A flexible rod (20) is articulated at a first end to a control ring (30) and is fixed at a second end to a pivot of a blade (10) that is to be controlled. At this second end, it is held so that it can rotate without play on the blade pivot by a holding device (44; 52; 54). The articulation device comprise a pivot (24) passing through a first orifice (22) pierced in this first end and engaged in a radial housing (28) of the control ring, the pivot being held in position by a locking ring (34) which has openings (36) for the passage of this pivot and which slides on this control ring. The fixing device comprise a fixing screw (40) passing through a second orifice (38) pierced in the second end of the rod and introduced into a hole (42) of the pivot of the blade that is to be controlled.

10 Claims, 4 Drawing Sheets

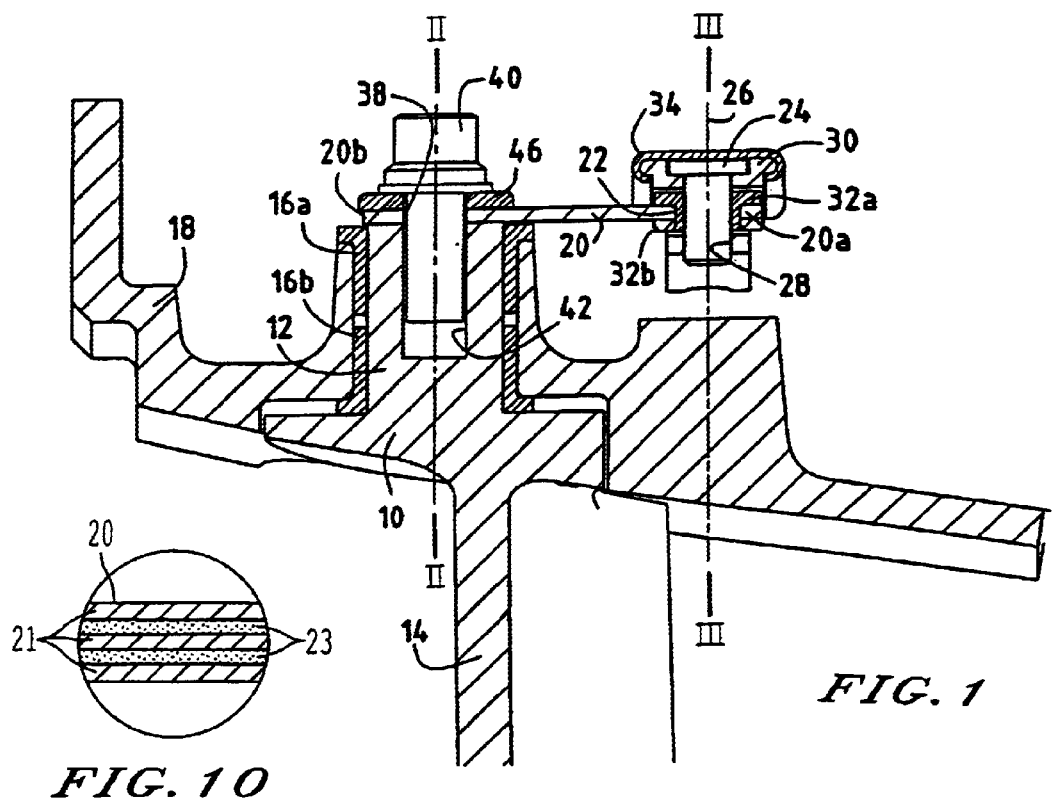
FIG. 1
FIG. 10
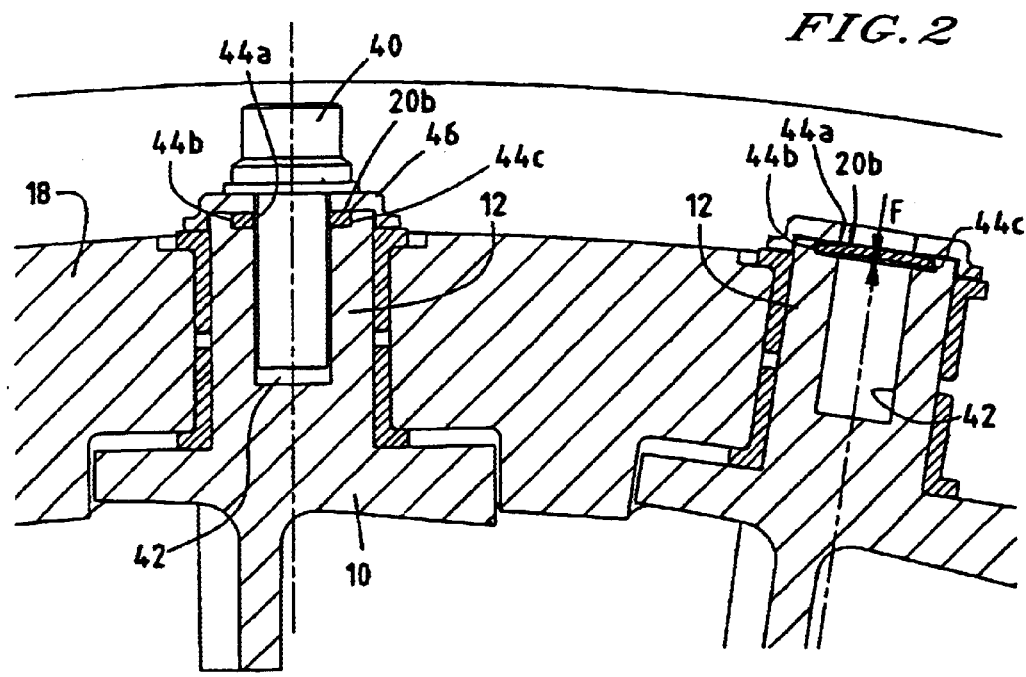
FIG. 2

US 6,688,846 B2

DEVICE FOR CONTROLLING VARIABLE-PITCH BLADES

FIELD OF THE INVENTION

The present invention relates to the control of variable-pitch blades. It finds a particular application in the field of aeronautics, particularly for controlling the angular positions of guide vanes which guide the air inlet into compressors of turbomachines such as turbojet or turboprop aero engines.

BACKGROUND OF THE INVENTION

Known devices for controlling variable-pitch blades in a turbomachine conventionally comprise a control member in the form of a ring surrounding a casing of the turbomachine and a number of levers, or rods, each rod having a first end connected to the control ring by an articulation and a second end mounted on a pivot of a respective blade.

Synchronized modification of the angular position of the blades is achieved by rotating the ring about the axis of the turbomachine. In order to be able to accompany the rotational movement of the ring, the connection between each rod and the ring has at least one degree of freedom in rotation about an axis directed approximately radially with respect to the ring. However, as the rod is mounted rigidly on the pivot of the corresponding blade, rotating the ring gives rise to other relative movements of the ring and that part of the rod that is mounted on the blade pivot. In order to tolerate these additional movements, or at least some of them, it is widely known practice for the connection to be produced in the form of a ball joint or similar component which, aside from rotating about an axis which is approximately radial with respect to the ring, allows rotation about an axis directed approximately circumferentially with respect to the ring. It is has also been proposed for a connection to be produced that offers an additional degree of freedom in translation in an approximately radial direction with respect to the ring. It is possible, among others, to refer to documents FR-A-2 608 678 or FR-A-2 746 141.

The use of mechanical articulations of the ball joint or similar type in a device for controlling a set of blades or, simultaneously, several sets of blades, entails the production of a great many parts at a relatively high cost. Furthermore, such articulations are subject to wear which may adversely affect their operation.

As an alternative, it has also been proposed for these movements, or at least some of them, to be tolerated through elastic deformation of the rod. Reference may be made, among others, to documents U.S. Pat. No. 4,367,264 and U.S. Pat. No. 4,979,874.

However, in those documents, the capacity for elastic deformation is provided by a thinning of the rod in its central part, between the ends connected to the control ring and to a blade pivot. Now, on the one hand, it is necessary to confer flexibility that is sufficient not to impede the transmission of movement between the control ring and the blades and, on the other hand, it is necessary to maintain a rod thickness that is great enough to withstand fatigue and avoid the risk of buckling. The best compromise between these contradictory requirements is difficult to find.

PURPOSE AND SUMMARY OF THE INVENTION

The object of the invention is to avoid the disadvantages of the devices of the prior art by proposing a control device using a flexible rod which has very good resistance to mechanical fatigue brought about by repeated actuation and very high resistance to buckling, while at the same time having a flexibility that allows it easily to deform in torsion, in the entire range of rotation of the control ring. Another object of the invention is to propose a device which allows its mounting to be simplified and also allows individual rods to be removed quickly and simply. Yet another object of the invention is to propose a device which has particularly low hysteresis at the blade/rod connection.

These objects are achieved by virtue of a device of the type comprising a rod, connecting means forming an articulation between a first end of the rod and a control ring, and means for fixing a second end of the rod to a pivot of a blade that is to be controlled, in which device, according to the invention, the said connecting means comprise a pivot passing through a first orifice pierced in the said first end of the rod and engaged in a radial housing of the said control ring, the said pivot being held in position by a locking ring which has openings for the passage of this pivot and which slides on the said control ring, the said fixing means comprise a fixing screw passing through a second orifice pierced in the said second end of the rod and introduced into a hole of the said pivot of the blade that is to be controlled, and the said device further comprises means for holding the said rod on the said blade pivot so that it can rotate without play.

With this particular structure, on the one hand, the device is far easier to mount/remove because of the monoblock nature (obtained by the presence of the locking ring) of the control ring and rods assembly and, on the other hand, the replacement of individual rods, without dismantling the control ring, is made particularly easy. Furthermore, automatic compensation for play in the blade-rod connection makes it possible to avoid, or at the very least to considerably reduce, any hysteresis.

According to a preferred embodiment, the said means for holding without play comprise a radial slot made in the said blade pivot and the width of which is narrower than that of the said second end of the rod that it is intended to accommodate. To do that, the said rod is advantageously curved about its longitudinal axis.

According to another embodiment of the invention, the said means for holding without play comprise at least one tenon made in the said blade pivot and intended to collaborate with tabs cut in the said second end of the rod. This cutout of the tabs preferably has a shape in accordance with FIG. 9.

According to one particularity of the invention, the said rod has, at its second end, a part which is wider than its first end and to which it gradually connects.

In order, in particular, to compensate for play between the rod and the control ring, the said radial housing is delimited by a liner fixed into the said first orifice of the rod. Likewise, in order to keep the rod pressed against the blade pivot, there is a stop inserted between the said second end of the rod and the said fixing screw.

Advantageously, the said rod is made of a laminated structure comprising thin rigid layers, formed of metal sheet, alternating with layers of elastomer, the layers being bonded together.

The presence of a laminated structure makes the rod behave in a remarkable way. Because of the thin nature of the metal layers, bonded together by layers of elastomer, the rod is easily deformable in bending and in torsion. In addition, there is no significant variation in the resistance to deformation throughout the range of operation of the control ring. The control of the pitch of the blades is therefore precise and easy. Furthermore, in spite of how thin they are, the metal layers together with the elastomer layers form an assembly which has very high resistance to fatigue and to buckling.

In one preferred embodiment that facilitates the mounting/removal of the rods, the said control and locking rings are each made in two parts, each extending over 180° of the circumference of the turbomachine.

BRIEF DESCRIPTION OF THE DRAWINGS

The invention will be better understood from reading the description given hereinafter, by way of non-limiting indication, with reference to the appended drawings, in which:

FIG. 1 is a view in section on an enlarged scale of a first embodiment of a control device according to the invention;

FIG. 2 is a view in section on the plane II—II of FIG. 1;

FIG. 10 illustrates a detailed side view of the flexible rod shown in FIG. 5.

DETAILED DESCRIPTION OF PREFERRED EMBODIMENTS

Figure 3:
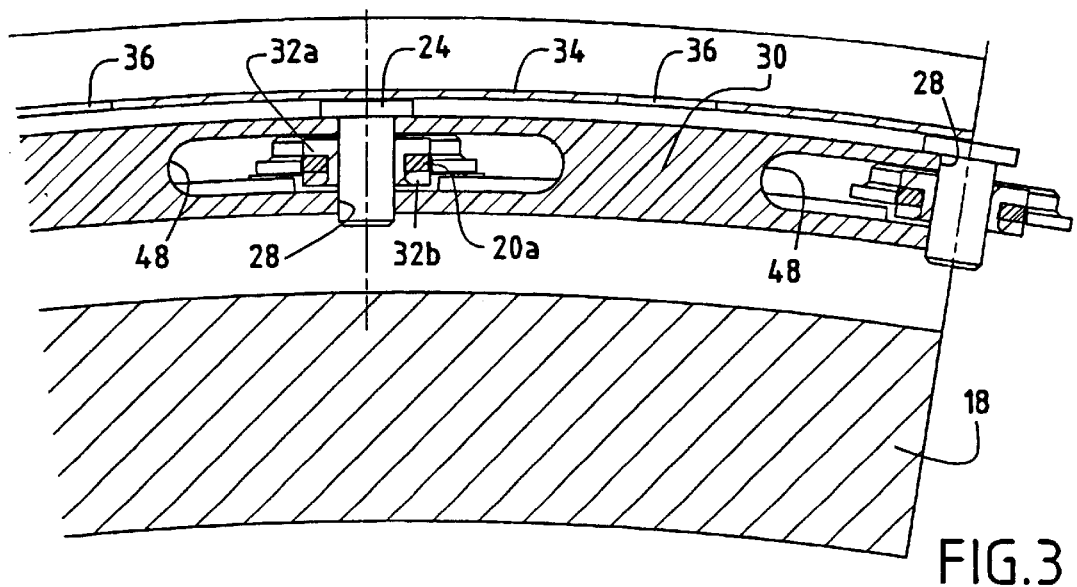
FIG. 3 is a view in section on the plane III—III of FIG. 1.
Figure 4:
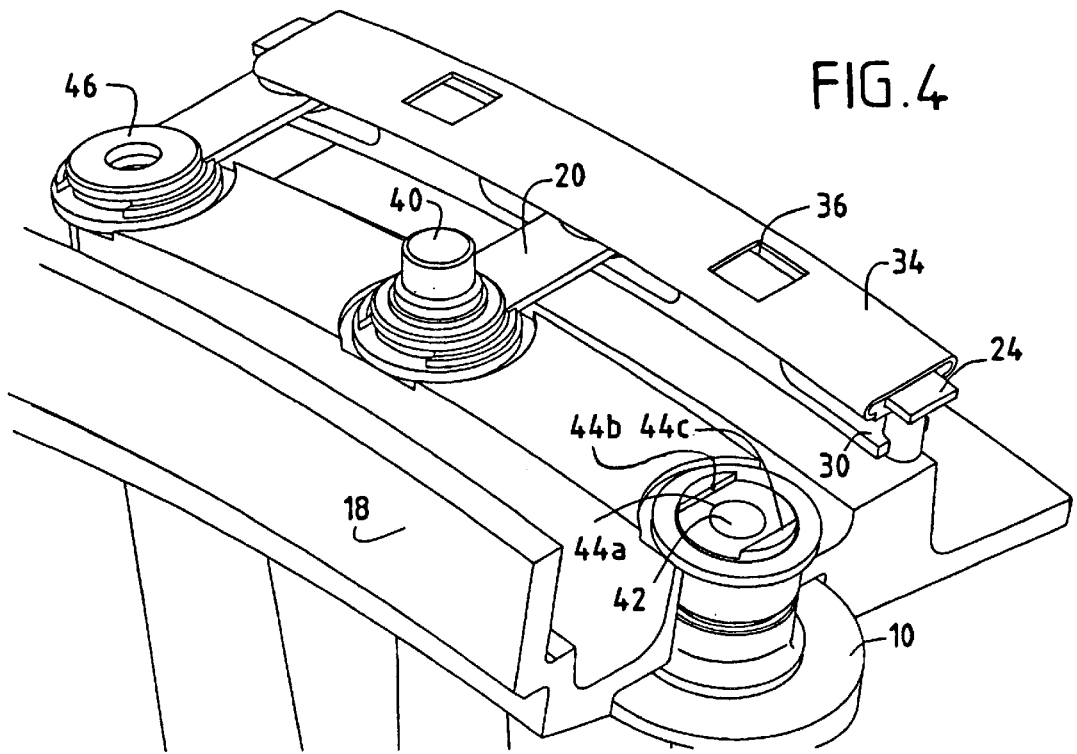
FIG. 4 depicts, in perspective, the control device of FIG. 1.

FIGS. 1 to 3 illustrate in section, and FIG. 4 illustrates in perspective, a part of a turbomachine, aircraft turbojet or turboprop or any other land or marine power plant, for example one of the guide vanes distributed about the axis of the turbomachine and placed at the inlet to the compressor. This blade 10 is of the variable-pitch type.

Each blade 10 has a blade pivot 12 of axis 14 which can rotate inside a plain bearing defined by a bushing 16a, 16b passing through part of the body 18 of the turbomachine (in this particular instance an outer shroud or the flow-straightener housing).

Figure 5:
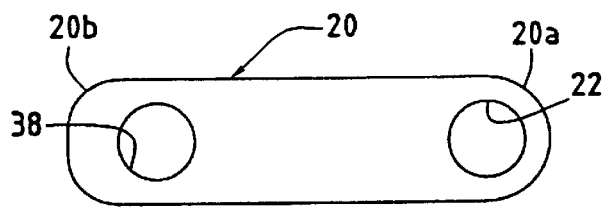
FIG. 5 illustrates a flexible rod used in the control device according to the invention.

The angular movement (pitch control) of each blade 10 is brought about by a flexible rod 20 (illustrated in FIGS. 5 and 10) preferably having a flexible composite structure such as a laminated structure consisting of thin metal layers 21 alternating with layers of elastomer 23, the layers being bonded together. The metal layers 21 are formed of sheet metal preferably less than 0.5 mm thick, cut from strip or foil made, for example, of steel, stainless steel, or any other metal suited to the envisaged application. Likewise, the layers of elastomer 23 are made, for example, of natural rubber, chloroprene, butadiene, nitrile, epichlorhydrine, silicone, etc., the choice being made according to the desired mechanical properties and the environmental conditions.

At a first end 20a, the rod 20 has a first orifice 22 intended to accommodate connecting means formed by a pivot 24 of axis 26 engaged in a radial housing 28 of a control ring 30. This housing is advantageously delimited by a liner 32 (an assembly of two parts crimped together: a sleeve 32a and a ring 32b) mounted in the first orifice 22 formed through the rod 20 and intended on the one hand to compensate for the play between the rod and the control ring and, on the other hand, to give sufficient length for centring to react the forces of the pivot 24. The pivot is held in position by a locking ring 34 sliding over the control ring and equipped with openings 36 of a shape corresponding to that of the pivot (or more precisely of its head). At a second end 20b, the opposite end to the first, the rod 20 has a second orifice 38 intended to accommodate fixing means formed by a fixing screw 40 engaged in a tapped blind hole 42 of the blade pivot 12. This rod is prevented from rotating independently of the pivot 12 and held without play in the blade pivot by being engaged in a radial slot 44, of a width narrower than the width of the rod, made in this pivot and forming a seat 44a for the rod and two flat radial positioning edges 44b, 44c (FIGS. 2 and 4). A washer forming a stop 46 is inserted between the end 20b of the rod and the fixing screw 40.

The control ring 30, the axis of which is coincident with the longitudinal axis of the turbomachine, can rotate about its axis. It has a number of apertures 48, the number of these being the same as the number of blades, pierced radially and of a width appreciably wider than that of a rod. As a preference, it is made in two parts (two half-rings) each covering 180° of the circumference of the turbomachine. These parts are connected (locked) together by a connecting ferrule (not depicted). Rotational drive is provided in the conventional way by one or more rams (not depicted). Rotating the control ring allows the angular position of the blades 10 to be varied via the rods 20. Likewise, the locking ring 30 is formed in two parts each also covering 180°. A single assembly covering 360° is, of course, possible, depending on the architecture of the turbomachine.

Figure 6:
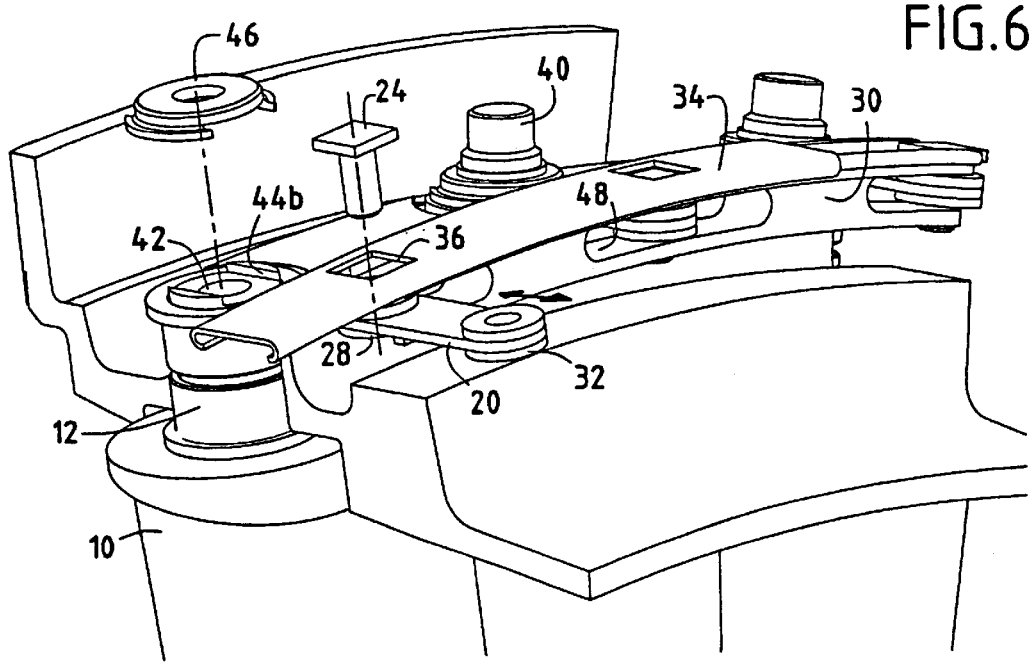
FIG. 6 shows, in perspective, successive steps in installing the control device of FIG. 1.

The mounting/removal of the blades will now be illustrated with reference to FIG. 6. Fitting is essentially performed in two stages.

A first stage, which can be performed separately at the workshop (this is one of the significant advantages of the invention) consists in mounting all the rods 20 individually on the control ring 30 and in locking them in place using the locking ring 34. To do that, and for each rod, the liner 32 is mounted by crimping (other techniques could be used for fixing the ring 32b to the sleeve 32a) in the first orifice 22 of the rod then the assembly is introduced through the aperture 48 of the control ring 30. The pivot 24 is then introduced through the opening 36 of the locking ring 34 and fixed to the end 20a of the rod by simply introducing this pivot into the liner 32. Once all the rods have been installed, all that remains to be done is for the locking ring to be rotated through a distance equal to half an inter-blade spacing, so that the pivots 24 automatically find themselves locked in position and secured to the control ring 30, thus forming a monoblock assembly. The two parts of the sliding ring 34 are then themselves locked together, for example using a fitting (not depicted).

The second step, this one performed directly on site, then consists in mounting the entire assembly thus constructed directly on the various pivots 12 of the blades 10. To do that, the ends 20b of the rods are placed one by one on the seat 44a of this pivot and are each fixed to the latter by the fixing screw 40 via the stop washer 36. Tightening down the stop washer 46 using the fixing screw 40 makes it possible to keep the layers of the laminated structure squashed together and to avoid unwanted unsticking (delamination) at the interior wall of the second orifice 38. Fitting the pivot 24 at the other end of the rod produces the same effect at the interior wall of the first orifice 22.

It will be noted, and this is another important aspect of the invention, that in order to allow automatic compensation for the play between the blade pivot and the rod and thus limit the hysteresis inherent in such an assembly and which results from manufacturing tolerances, the rod 20 has a width in the flat state which slightly exceeds that of the slot 44 lying between its flat edges 44c, 44d. To make it easier to mount, the rod will advantageously be curved (about its longitudinal axis) at the time of its manufacture in order to obtain a deformation "f" as illustrated previously in FIG. 2. However, it is also possible to envisage a mounting under slight stress with a rod manufactured flat.

Removal is achieved by doing exactly the same in reverse. However, and this is another essential advantage of the invention, with the structure described, it is possible to remove each rod individually. Indeed all that is required first of all is for its fixing 40, 46 to be dismantled, then for the apertures 36 of the locking ring 34 to be brought into coincidence with the pivots 24 (of course having already unlocked this ring) and for the pivot 24 corresponding to the rod 20 that is to be changed then to be extracted, and finally for this rod to be removed through the aperture 48 of the control ring 30. A new rod can then be set back in position simply by performing the reverse.

Figure 7:
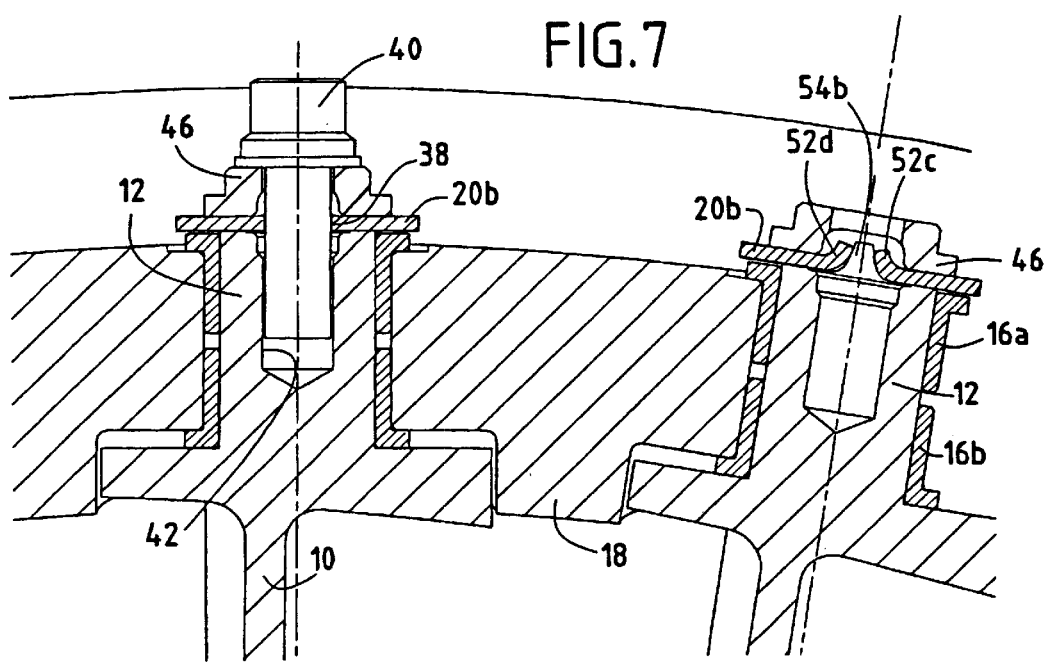
FIG. 7 is a view in section on an enlarged scale of a second embodiment of a control device according to the invention.
Figure 9:
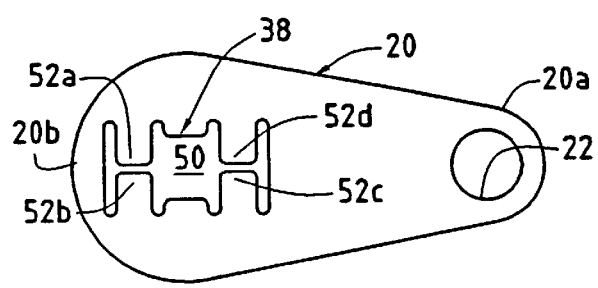
FIG. 9 illustrates a flexible rod used in the control device according to the invention.
Figure 8:
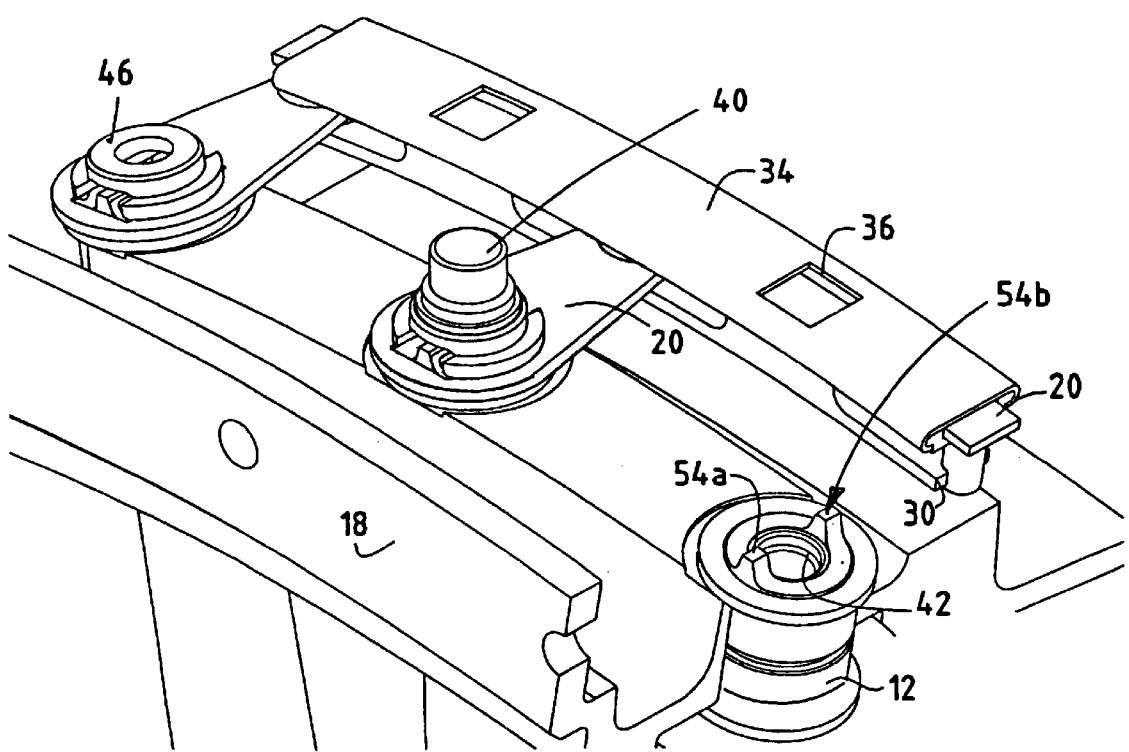
FIG. 8 is a view in perspective of the control device of FIG. 7.

FIGS. 7 to 9 illustrate a second embodiment of the invention, in which the rod also has a laminated structure, but with a different geometry. Specifically, on the one hand, the second end part 20b intended to be connected with the blade pivot 12 has a width greater than that of the opposite end 20a to which it gradually connects and, on the other hand, the second orifice 38 has a special-purpose non-circular cutout visible particularly in FIG. 9 and intended, on the one hand, to centre and, on the other hand, to guide, the rod with respect to the blade pivot. This cutout has, on each side of an approximately rectangular central region 50, and on each side of a longitudinal central axis of the rod, tabs 52a, 52b, 52c, 52d intended to be bent against tenons 54a, 54b emerging from the upper part of the blade pivot 12. The central part is intended to centre the fixing screw 40, the axis of which falls perfectly inside this rectangular region and the tabs once bent against the tenons under the action of the fixing screw and of the stop washer 46 provide guidance with the automatic compensation of play between the rod and the blade pivot.

FIG. 7 is a view in section which shows the fixing of the rod at its second end 20b, before and after the fitting of the fixing screw 40. Elements which conform to the first embodiment carry the same references. Note the deforming action exerted by the tenon 54b on the tabs 52c, 52d of the rod 20 which allows this rod to be held perfectly and without play. Finally, FIG. 8 illustrates, in perspective, in three different steps, the connecting of the blade with the control ring. Noted here too will be the presence of the tenons directed radially at the upper part of the blade pivot. Mounting/removing all the rods or individual rods is performed as in the previous embodiment, and reference should be made thereto.

As already mentioned, the use of a flexible composite structure such as a laminated structure is particularly advantageous because it makes it possible to combine flexibility and mechanical strength throughout the operating range. An advantageous feature lies in the fact that the resistance to torsional deformation does not vary significantly in this range, which means that the blade pitch can be controlled precisely.

What is claimed is:

1. Device for controlling a variable-pitch blade in a turbomachine, comprising a rod, connecting means forming an articulation between a first end of the rod and a control ring, and means for fixing a second end of the rod to a pivot of a blade that is to be controlled, characterized in that the connecting means comprise a pivot passing through a first orifice pierced in the first end of the rod and engaged in a radial housing of the control ring, the pivot being held in position by a locking ring which has openings for the passage of this pivot and which slides on the control ring, in that the fixing means comprise a fixing screw passing through a second orifice pierced in the second end of the rod and introduced into a hole of the pivot of the blade that is to be controlled, and in that the device further comprises means for holding the rod on the blade pivot so that the rod can rotate without play.

2. Device according to claim 1, characterized in that the means for holding without play comprise a radial slot made in the blade pivot and the width of which is narrower than that of the second end of the rod that it is intended to accommodate.

3. Device according to claim 2, characterized in that the rod is curved about its longitudinal axis.

4. Device according to claim 1, characterized in that the means for holding without play comprise at least one tenon made in the blade pivot and intended to collaborate with tabs cut in the second end of the rod.

5. Device according to claim 4, characterized in that the cutout around the tabs is formed on each side of a longitudinal central axis of the rod and on each side of an approximately rectangular central region intended to center the fixing screw.

6. Device according to claim 4, characterized in that the rod has, at the second end, a part which is wider than the first end and to which it gradually connects.

7. Device according to claim 1, characterized in that the radial housing is delimited by a liner fixed into the first orifice of the rod.

8. Device according to claim 1, characterized in that the fixing means further comprise a stop inserted between the second end of the rod and the fixing screw and intended to keep the rod pressed against the blade pivot.

9. Device according to claim 1, characterized in that the rod is made of a laminated structure comprising thin rigid layers, formed of metal sheet, alternating with layers of elastomer, the layers being bonded together.

10. Device according to any one of claims 1 to 9, characterized in that the control and locking rings are each made in two parts, each extending over 180° of the circumference of the turbomachine.

* * * * *